United States Patent
Cheng et al.

(10) Patent No.: US 8,410,186 B2
(45) Date of Patent: Apr. 2, 2013

(54) PROCESS FOR MANUFACTURING POROUS EPOXY WITH OPEN PORES AND POROUS EPOXY MADE THEREFROM

(75) Inventors: Kuo-Chung Cheng, Taipei (TW); Yu-Shun Luo, Taipei (TW); Ching-Lin Wu, Taipei (TW); Chiu-Ya Wang, Taipei (TW); Yi-Min Chang, Taipei (TW)

(73) Assignee: National Taipei University of Technology, Taipei (TW)

( * ) Notice: Subject to any disclaimer, the term of this patent is extended or adjusted under 35 U.S.C. 154(b) by 284 days.

(21) Appl. No.: 12/910,244

(22) Filed: Oct. 22, 2010

(65) Prior Publication Data

US 2011/0269859 A1 Nov. 3, 2011

(30) Foreign Application Priority Data

Apr. 30, 2010 (TW) ................................ 99113763 A

(51) Int. Cl.
*C08J 9/28* (2006.01)
*B05D 1/26* (2006.01)
(52) U.S. Cl. .............................. 521/64; 521/63; 427/373
(58) Field of Classification Search .................... 521/63, 521/64, 31, 32; 427/373; 264/41
See application file for complete search history.

(56) References Cited

U.S. PATENT DOCUMENTS 4,828,771 A * 5/1989 Kishima et al. ................. 264/41

OTHER PUBLICATIONS

Keifer and Hilborn, "Chemically Induced Phase Separation: A New Technique for the Synthesis of Macroporous Epoxy Networks," *Polymer*, 37(25), pp. 5715-5725, 1996.
Loera et al., "Porous Epoxy Thermosets Obtained by a Polymerization-Induced Phase Separation Process of a Degradable Thermoplastic Polymer," *Macromolecules*, 35, 6291-6297, 2002.

* cited by examiner

*Primary Examiner* — Randy Gulakowski
*Assistant Examiner* — Kara Boyle
(74) *Attorney, Agent, or Firm* — Ladas & Parry LLP

(57) ABSTRACT

The present invention relates to a process for manufacturing a porous epoxy network, especially a porous epoxy membrane. The process according the present invention comprises the steps of: providing a reactant solution comprising an epoxy resin, a solvent and a curing agent; performing a first curing process to transform the reactant solution to a gel; and performing a second curing process to essentially remove the remaining solvent and transform the gel to form a porous epoxy network with open pores; wherein the curing agent is a tertiary amine.

16 Claims, 9 Drawing Sheets

PROCESS FOR MANUFACTURING POROUS EPOXY WITH OPEN PORES AND POROUS EPOXY MADE THEREFROM

FIELD OF THE INVENTION

The present invention relates to a process for manufacturing a porous epoxy network, especially a porous epoxy membrane. In particular, the present invention relates to a process for manufacturing a porous epoxy network or membrane with open pores.

BACKGROUND OF THE INVENTION

Porous polymers have been found useful in many applications. Among various polymers, epoxy can be used in a wide range of applications such as coatings, adhesives and composite materials due to its great versatility, low shrinkage, good chemical resistance, low dielectric constant and outstanding adhesion.

Different methods have been developed to produce porous polymers of different morphology. One of the methods commonly used is chemical induced phase separation (CIPS). In CIPS, a homogeneous solution of monomers or prepolymers and a solvent becomes phase separated during polymerization, and a porous polymer might be obtained by heating the solution to a temperature higher than the glass transition temperature ($T_g$) of the polymer to remove the solvent. To obtain a porous polymer of good quality, the heating is normally done by a stepwise manner, that is, to heat the solution of monomers or prepolymers and a solvent to a temperature sufficient to form a polymeric gel first, and then heat the polymeric gel to a temperature above the $T_g$ of the polymer for a certain period to obtain a stable polymer. For a thermosetting polymer (e.g., epoxy), the term "gel" refers to a state where the polymer is partially cross-linked and can no longer be dissolved by a solvent while at least part of the original solvent remains therein.

Porous epoxy can be made by CIPS, too. By heating up the solution of diglycidylether bisphenol-A epoxy (DGEBA) and 2,2'-bis(4-amino-cyclohexyl)propane (as a curing agent) in the presence of hexane and/or cyclohexane (as a solvent), a porous epoxy network can be prepared. By adjusting reaction conditions, the morphology of the porous epoxy can be varied (see, J Kiefer, *Polymer*, 37(25), 1996, pp. 5715-5725). However, the epoxy network obtained by the above method is with pores of closed cells.

By incorporating poly(vinylmethyl)ether into epoxy resin, one may obtain epoxy networks with open pores. However, poly(vinylmethyl)ether is difficult to be removed, which may affect the stability of the network and cause problems.

Therefore, there is still a need for providing a new process for manufacturing a porous epoxy with open pores.

SUMMARY OF THE INVENTION

One object of the present invention is to provide a novel process for manufacturing a porous epoxy network with open pores comprising the steps of:
  providing a reactant solution comprising an epoxy resin, a solvent and a curing agent;
  performing a first curing process to transform the reactant solution to a gel; and
  performing a second curing process to essentially remove the remaining solvent and transform the gel to form a porous epoxy network with open pores;
  wherein the curing agent is a tertiary amine.

Another object of the present invention is to provide a novel process for manufacturing a porous epoxy membrane with open pores comprising the steps of:
  providing a reactant solution comprising an epoxy resin, a solvent and a curing agent;
  placing the solution on a carrier;
  performing a first curing process to transform the reactant solution to a gel; and
  performing a second curing process to essentially remove all the remaining solvent and transform the gel to a porous epoxy membrane with open pores;
  wherein the curing agent is a tertiary amine.

Yet another object of the present invention is to provide a porous epoxy network or membrane with open pores obtained by the process according to the present invention. The permeability of the porous epoxy network or membrane obtained by the process according to the present invention may vary in a wide range of 1 to 4700 ($m \cdot hr^{-1} \cdot bar^{-1}$). The porosity of the porous epoxy network or membrane obtained by the process according to the present invention is 0.1 to 0.8, preferably 0.5 to 0.7.

DETAILED DESCRIPTION OF THE INVENTION

The present invention is illustrated below in detail by the embodiments with reference to the drawings, which is not intended to limit the scope of the present invention. It will be apparent that any modifications or alterations that are obvious for persons having ordinary skill in the art fall within the scope of the disclosure of the specification.

Figure 1:
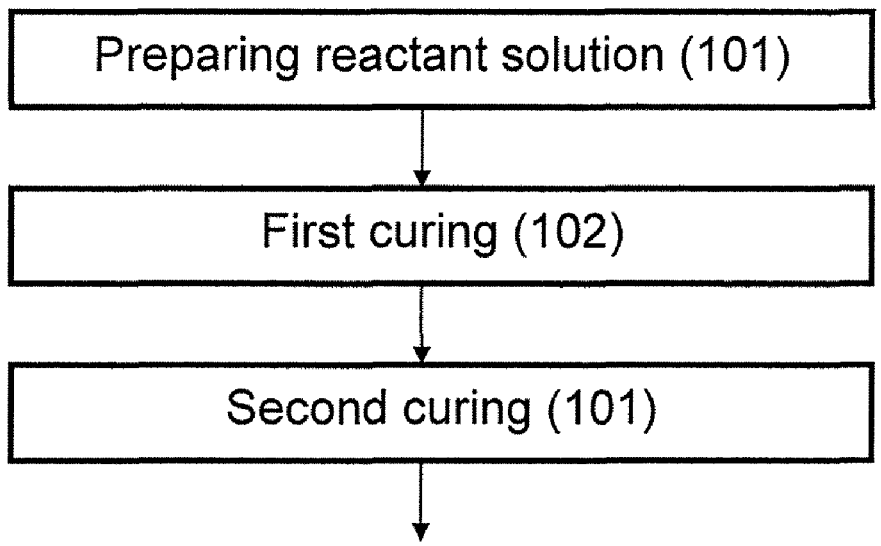
FIG. 1 schematically illustrates the process for manufacturing a porous epoxy network (or membrane) with open pores according to the present invention.

As illustrated in FIG. 1, the present invention provides a process for manufacturing an epoxy network with open pores comprising the steps of:
  providing a reactant solution comprising an epoxy resin, a solvent and a curing agent (101);
  performing a first curing process to transform the reactant solution to a gel (102); and performing a second curing process to essentially remove the remaining solvent and transform the gel to form a porous epoxy network with open pores (103).

The above steps are described in detail as follows.

Preparation of Reactant Solution (101)

The reactant solution is prepared by mixing a certain ratio of at least an epoxy resin, a solvent and a curing agent. The mixing can be done by adding the epoxy resin(s) to the solvent and stirring to obtain a homogeneous solution first, and then adding the curing agent to form the reactant solution.

A suitable epoxy resin can be selected from (but not limited to) the group consisting of diglycidyl ether of bisphenol A, diglycidyl ether of bisphenol F, polyglycidyl ether of phenol-formaldehyde novolac, polyglycidyl ether of o-cresol-formaldehyde novolac and a combination thereof. Diglycidyl ether of bisphenol A and diglycidyl ether of bisphenol F are preferred, and diglycidyl ether of bisphenol A is more preferred.

A suitable solvent can be selected from (but not limited to) n-hexane, cyclohexane, cyclohexanol, diisobutyl ketone (DISK), isopropanol, benzene, toluene, tetrahydrofuran, chloroform, methyl cyclohexane, dipropyl ether, methyl isobutanone, butyl butanoate, ethyl butanoate and a combination thereof. Cyclohexane and DIBK are preferred, and DIBK is more preferred.

The solvent can be in an amount of 10 vol % to 70 vol %, preferably 30 vol % to 70 vol %, more preferably 30 vol % to 50 vol %, based on the total volume of the reactant solvent. The curing agent according to the present invention is a tertiary amine. A suitable tertiary amine is selected from (but not limited to) the group consisting of 2,4,6-tris(dimethylamino methyl)phenol, 2-(dimethylamino methyl)phenol, α-methyl benzyl dimethyl amine, 2-dimethyl amino-2-hydroxy propane, triethanol amine, dialkyl amino ethanol, N,N'-dimethyl piperazine and a combination thereof. The curing agent is preferred to be in an amount of 0.1 to 20 parts per 100 parts epoxy resin.

In one embodiment according to the present invention, the reactant solution further comprises a second curing agent which is a primary amine. The primary amine can be selected from (but not limited to) the group consisting of diethylenetriamine (DETA), 4,4'-methylene dianiline, diamino diphenyl sulphone, 4,4'-thiodianiline and polymethylene diamine, and DETA is preferred. The weight ratio of the primary amine to the tertiary amine is less than 1:1, preferably less than 0.3:1.

First Curing (102)

In one embodiment of the process according to the present invention, the curing process is a thermal process. During the first curing step, the reactant solution is placed under a temperature which is lower than the boiling point of the solvent. The temperature is preferably 30° C. to 120° C., more preferably 30° C. to 80° C. The curing time is normally from 4 hrs to 48 hrs, preferably from 12 hrs to 30 hrs.

Figure 2:
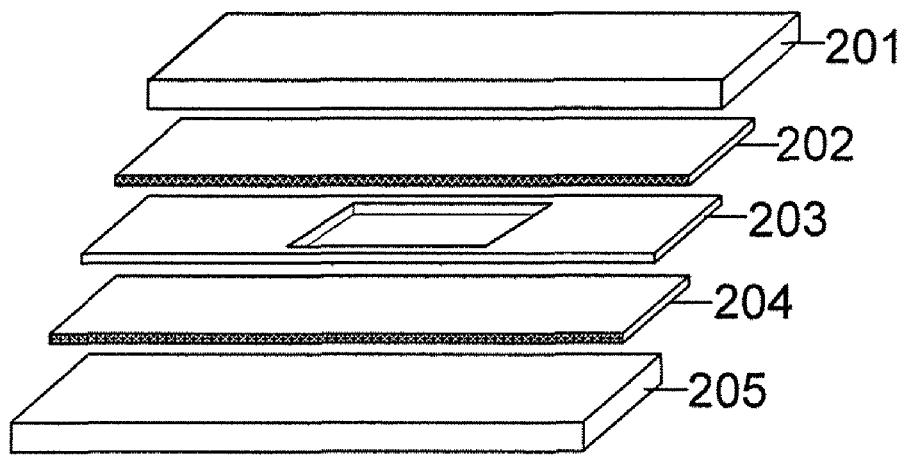
FIG. 2 shows the structure of the carrier used in the examples.
Figure 3A:
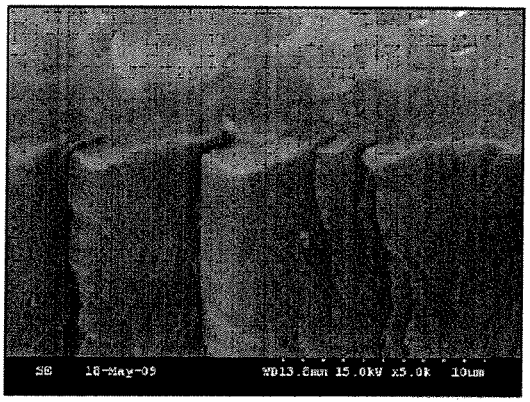
FIGS. 3A to 3F are the cross-sectional scanning electron microscope (SEM) images of the epoxy membranes obtained in EXAMPLE 1.
Figure 3D:
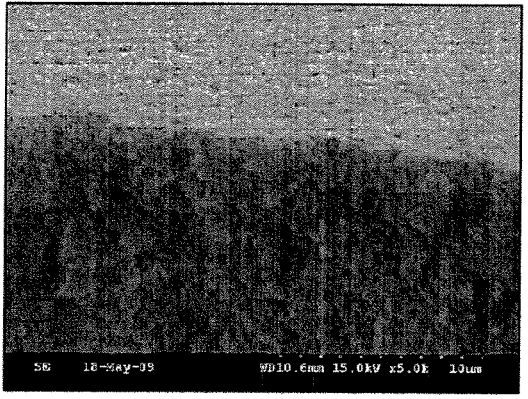
Figure 3B:
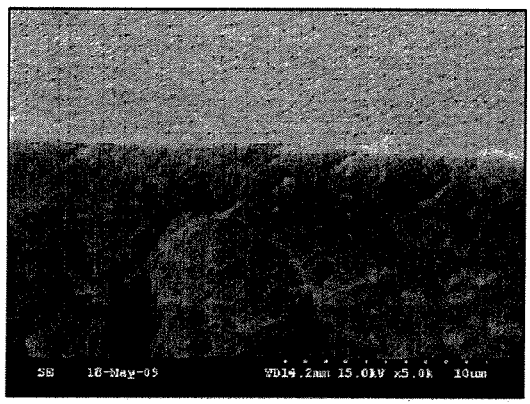
Figure 3E:
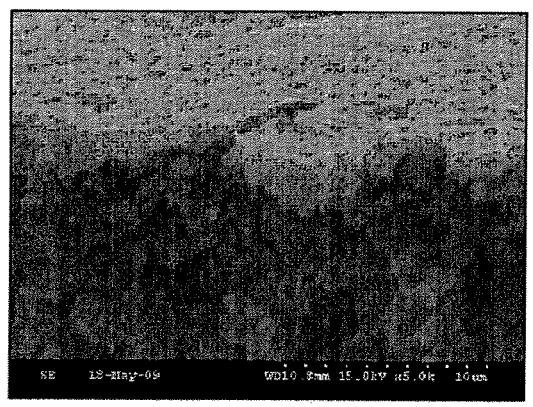
Figure 3C:
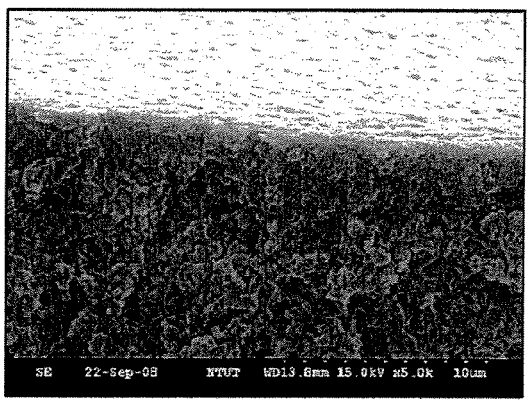
Figure 3F:
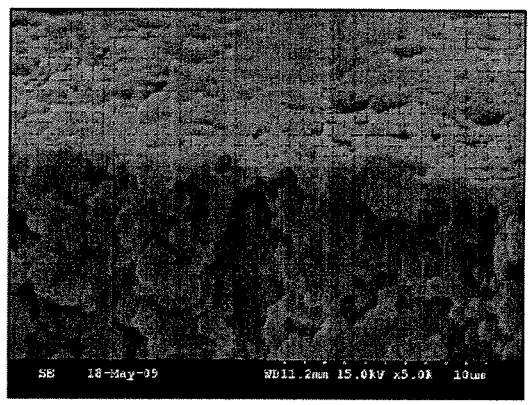
Figure 4A:
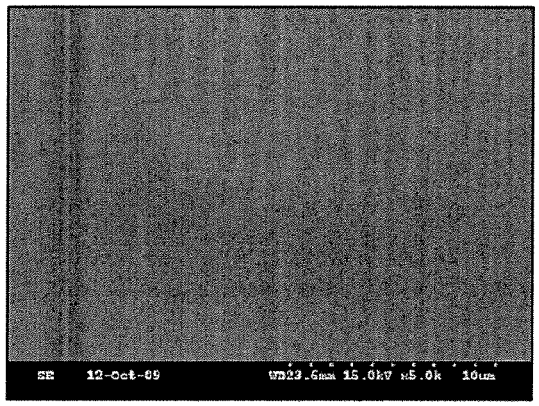
FIGS. 4A to 4F are the top view SEM images of the epoxy membranes obtained in EXAMPLE 1.
Figure 4D:
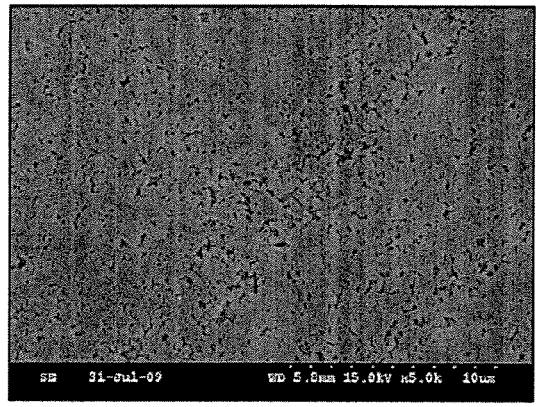
Figure 4B:
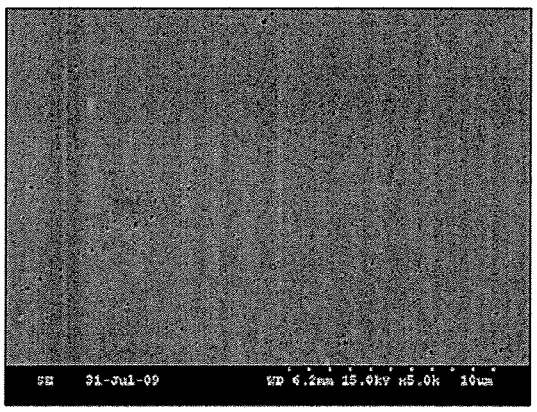
Figure 4E:
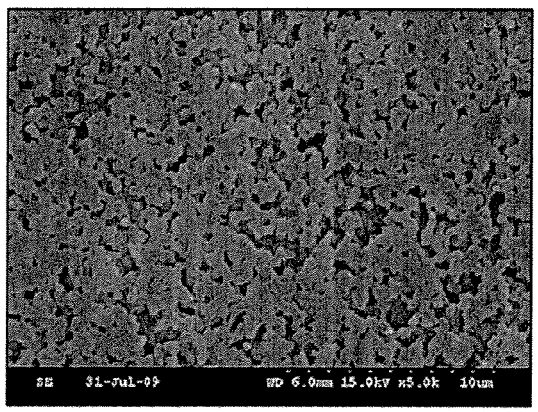
Figure 4C:
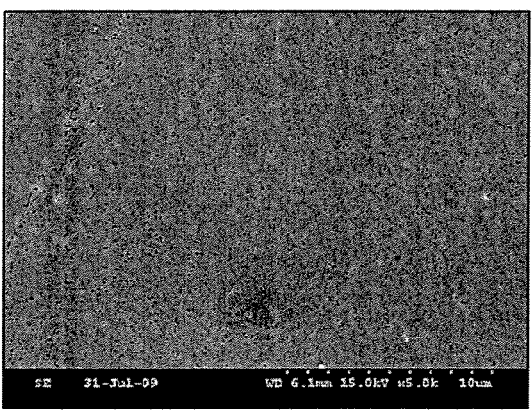
Figure 4F:
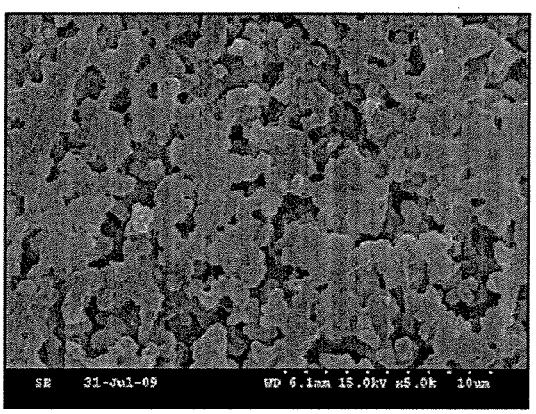

When an epoxy membrane is prepared, the reactant solution should be placed on a suitable carrier. In one embodiment according to the present invention, the carrier is a sandwich structure (as shown in FIG. 2) comprising glass sheets (201, 205), contacting sheets (202, 204) and a plate mold (203). The contacting sheets are to adjust the morphology of the surface of the polymeric membrane. The contacting sheets can be any suitable material such as Teflon or polypropylene, or any suitable materials coated with silicon wax or Teflon. The thickness of the membrane can be controlled by adjusting the thickness of the plate mold.

Second Curing (103)

After the first curing (102), the polymeric gel is then put into a vacuum oven and treated at a temperature. To substantially remove the remaining solvent, the process temperature should be higher than the boiling point of the solvent. The curing temperature is normally 150° C. to 400° C., preferably 170° C. to 350° C. The curing time is normally 4 hrs to 24 hrs.

The process for manufacturing an epoxy network or membrane according to the present invention is further illustrated by the following examples. In the examples, morphological and thermal properties of the membranes are evaluated:

Morphological Properties

The pores on the surface of a membrane can be observed by SEM and the following indices can be calculated:

Mean pore radius:

$$r_m = \sqrt{\frac{\sum n_i r_i^2}{\sum n_i}};$$

Pore density:

$$N/\mu m^2 = \frac{\sum n_i}{A_t}; \text{ and}$$

Surface porosity:

$$\varepsilon_S = \frac{\sum (n_i \pi r_i^2)}{A_t};$$

wherein $r_i$ represents the radius of the pores (μm); $n_i$ represents the number of the pores of a specific radius; and $A_t$ represents the total surface of the membrane in the SEM image.

It is difficult to directly observe the internal morphology of the membranes so it would be necessary to evaluate the internal morphology of the membranes by indices such as overall porosity and permeability. By conducting an ethanol permeation test, the overall porosity and permeability of the film can be calculated from the following equations:

overall porosity $$\varepsilon_v = \frac{W_w - W_d}{\rho_e \times V}$$

where $W_w$ is the weight of the membrane wetted by ethanol (kg), $W_d$ is the weight of the dry membrane (kg); $\rho_e$ is the density of ethanol at room temperature (kg/m$^3$); and V is the volume of the full wetted membrane (m$^3$);

Permeability:

$$J' = \frac{Q}{A \cdot \Delta p}$$

where Q is the steady volumetric flow rate of ethanol (m$^3$); A is the cross area of the membrane (m$^2$); and P is the pressure drop (bar) across the membrane.

In the examples, the above indices were obtained by measuring the ethanol flowing through a membrane which has a thickness of about 0.25 mm and is mounted between two steel circular rings with 13 mm inner diameter at room temperature and under a constant pressure difference of 0.8 bar. That is, ΔP is 0.8 bar.

Thermal Properties

In the examples, the glass transition temperature ($T_g$) was measured by differential scanning calorimeter (DSC) while the temperature at the maximum decomposition rate (at heating rate of 10° C./min until 650° C.), the temperature at 5% weight loss (under nitrogen purge at heating rate of 10° C./min) and char residue were measured by thermogravimetric analyzer (TGA).

Example 1

Diglycidyl ether of bisphenol A (D.E.R. 331, Dow Chem, U.S.A.) and 2,4,6-tris(dimethylamino methyl)phenol (DMP-30) were used in a ratio of 100:10. DIBK was used as a solvent. D.E.R. 331 was first mixed with DISK and stirred to form a homogeneous solution, and then DMP-30 was added into to solution. The solution was transferred into a plate mold having a thickness of 0.25 mm and covered and sealed with Teflon contacting sheets. The carrier was placed in a heat oven of 40° C. for 24 hrs to form a polymeric gel. The polymeric gel was then put into a vacuum oven of 170° C. for 24 hrs to remove the remaining DISK, and an epoxy membrane was formed. The morphology and thermal properties of the membrane were measured.

Figure 5:
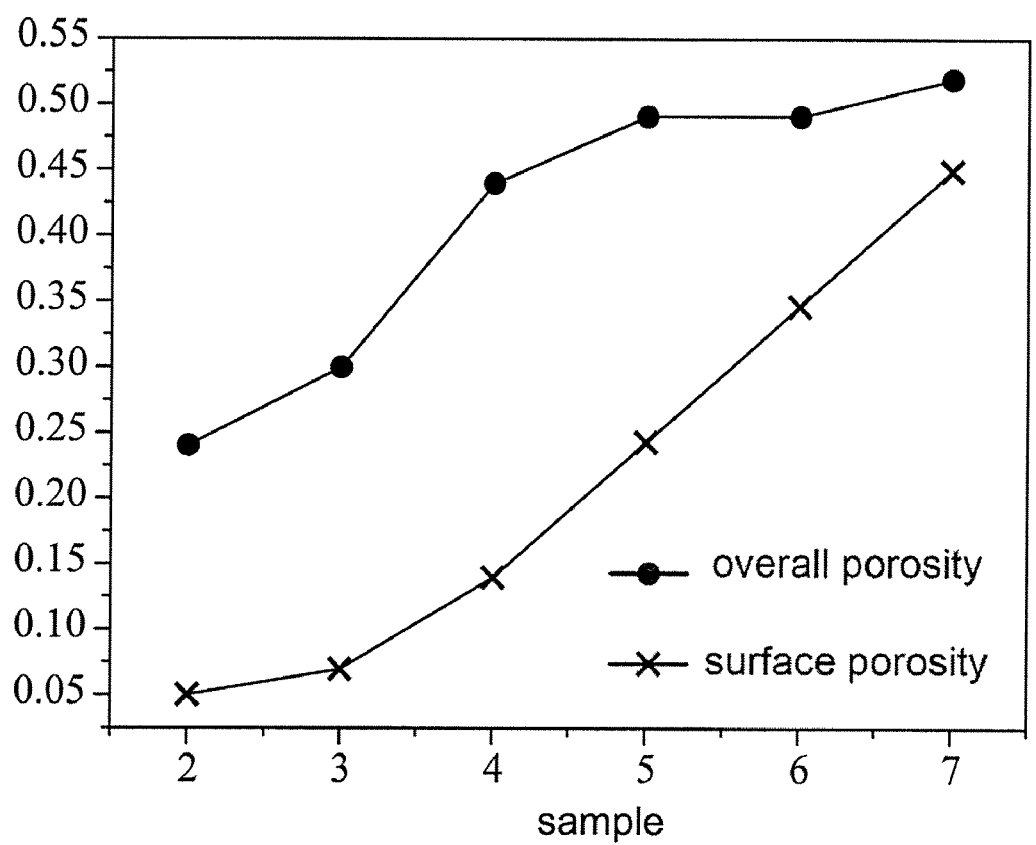
FIG. 5 shows the correlation of the overall porosity and the surface porosity of the membranes obtained in EXAMPLE 1.

The SEM images of the resultant samples are shown in FIGS. 3A to 3F and 4A to 4F. The morphological properties are listed in TABLE 1 and plotted in FIG. 5 (overall porosity and surface porosity).

TABLE 1

| SAMPLE | DIBK (vol %) | Mean pore radius (µm) | Surface porosity | Overall porosity | Permeability (m · hr⁻¹ · bar⁻¹) | FIGS. |
|---|---|---|---|---|---|---|
| 1 | 28 | — | — | — | 0 | 3A 4A |
| 2 | 30 | — | — | — | 0 | 3B 4B |
| 3 | 32 | 0.16 | 0.07 | 0.30 | 3 | 3C 4C |
| 4 | 34 | 0.38 | 0.14 | 0.44 | 25 | |
| 5 | 36 | 0.47 | 0.24 | 0.49 | 113 | 3D 4D |
| 6 | 38 | 1.08 | 0.35 | 0.49 | 548 | 3E 4E |
| 7 | 40 | 1.44 | 0.45 | 0.52 | 1482 | 3F 4F |

It can be seen that with the aid of the tertiary amine DMP-30, a porous epoxy membrane with open pores (so as to allow ethanol to permeate through) can be formed.

It should be also noted that the surface porosity, overall porosity and permeability are in a solvent-dependent manner. When the DIBK is less than 28 vol %, no pore is formed. When the DIBK is 30 vol %, fine pores are formed but the pores are too small to be measured. In addition, when the DIBK is 30 vol % or less, the membrane is not permeable, which infers that no open pores are formed within the membrane.

Figure 6:
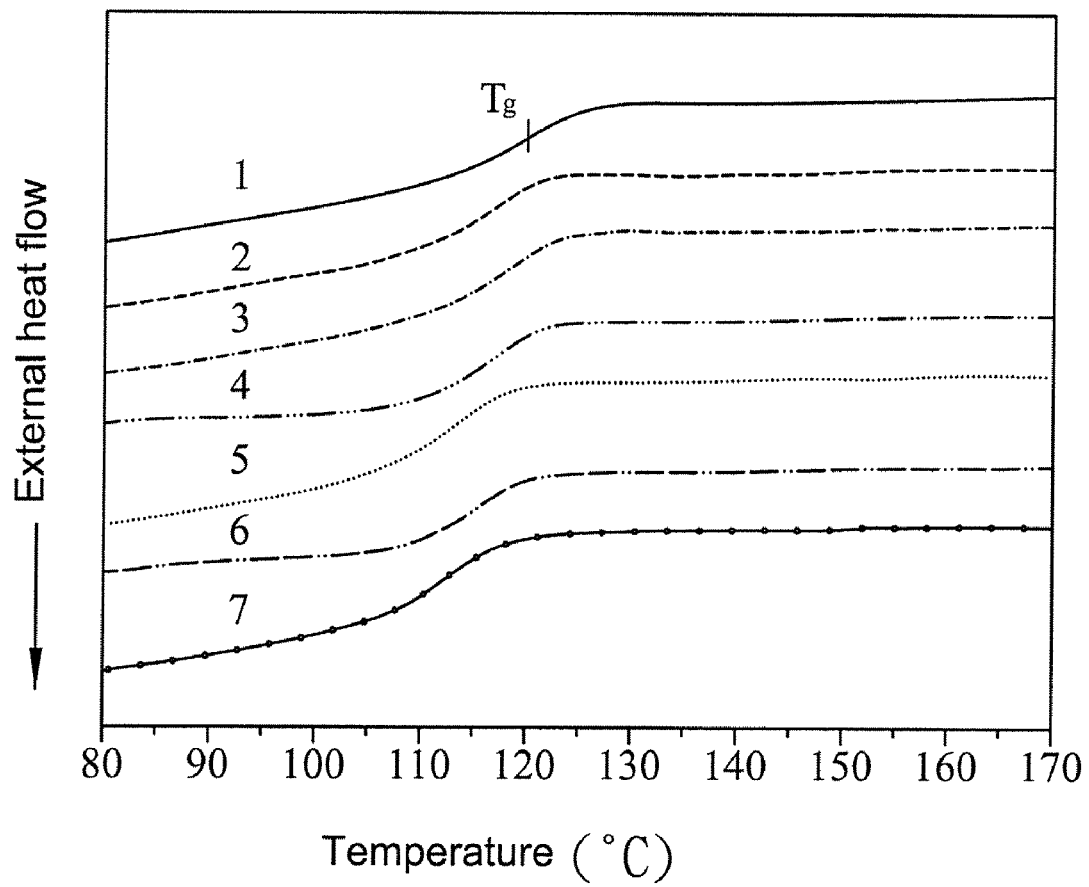
FIG. 6 is a schematic illustration of the glass transition temperature ($T_g$) of the membranes obtained in EXAMPLE 1.
Figure 7:
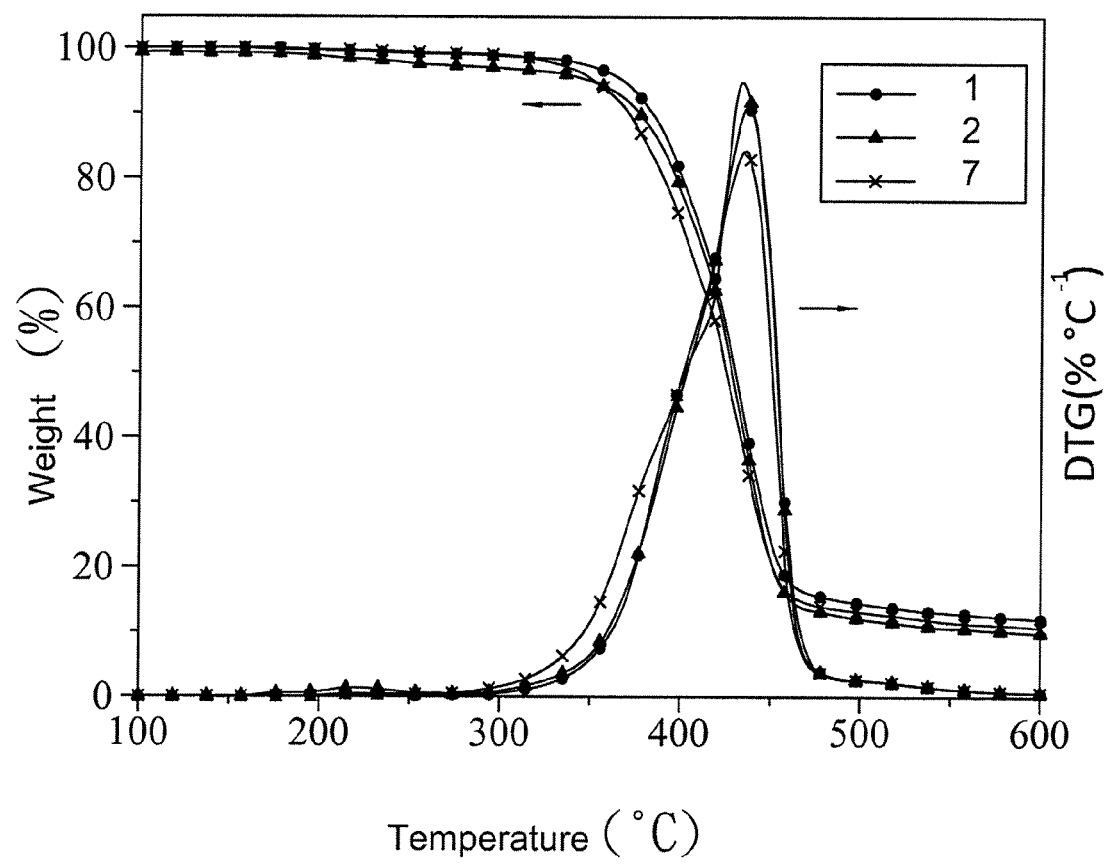
FIG. 7 is a schematic illustration showing the temperature at 5% weight loss ($T_{5\%}$) and the temperature at maximum decomposition rate ($T_{max}$) of the membranes obtained in EXAMPLE 1.
Figure 8A:
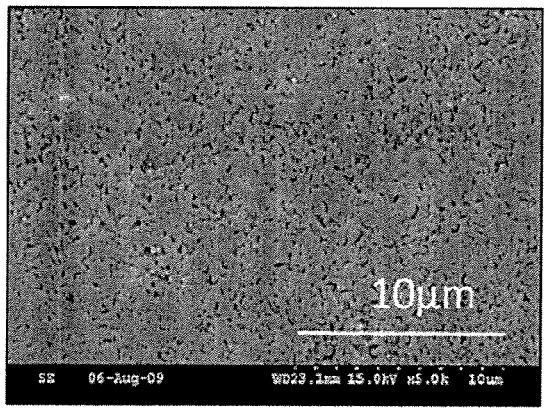
FIGS. 8A to 8E are the top view SEM images of the epoxy membranes obtained in EXAMPLE 2.
Figure 8D:
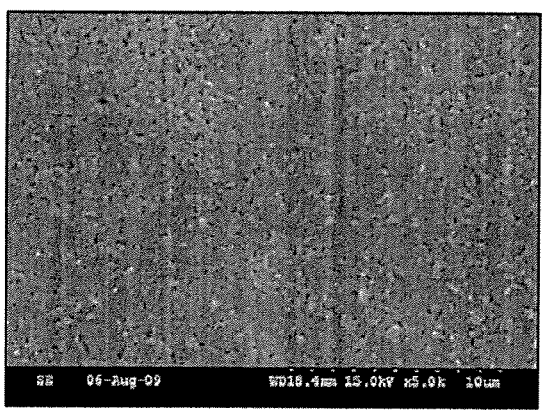
Figure 8B:
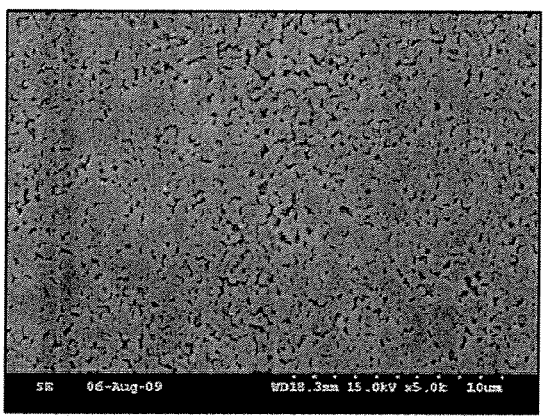
Figure 8E:
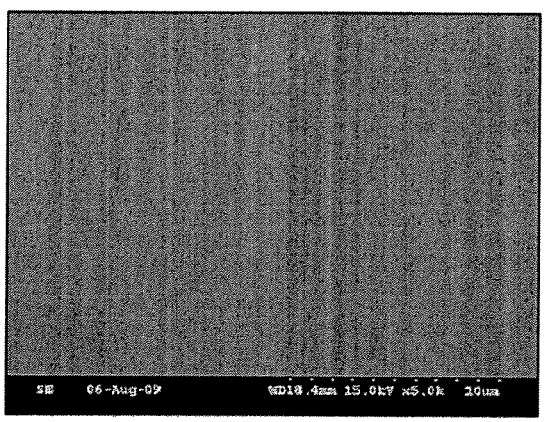
Figure 8C:
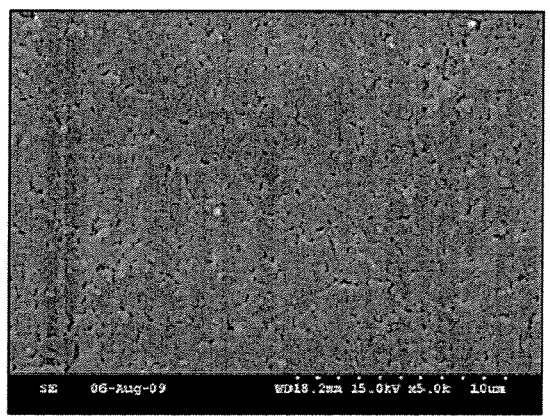
Figure 9A:
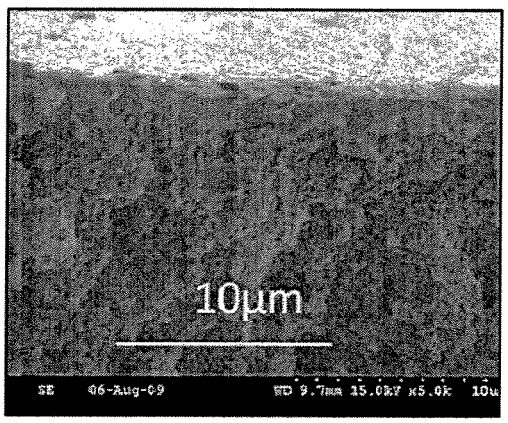
FIGS. 9A to 9E are the cross-sectional SEM images of the epoxy membranes obtained in EXAMPLE 2.
Figure 9D:
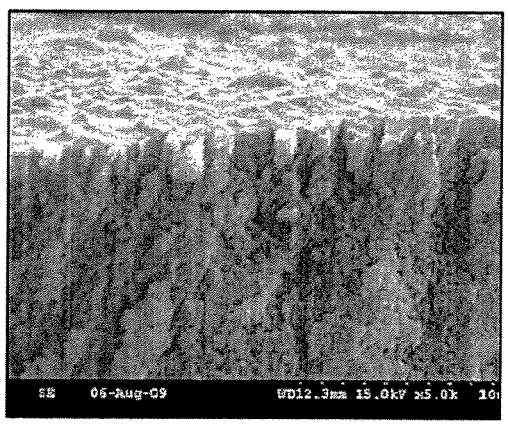
Figure 9B:
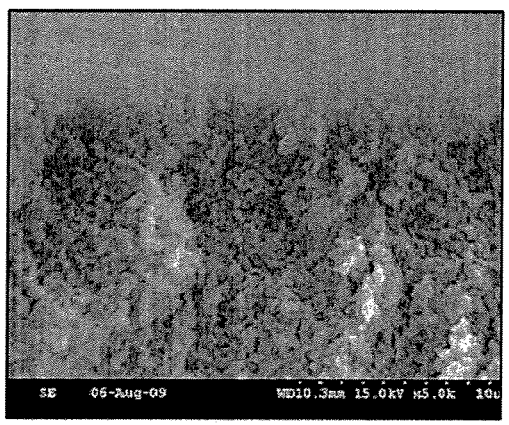
Figure 9E:
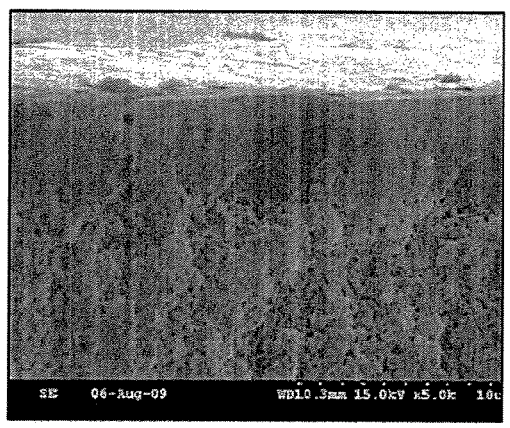
Figure 9C:
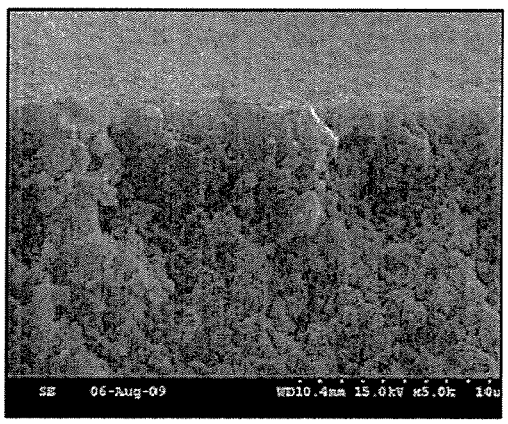

The thermal properties are listed in TABLE 2 and plotted in FIGS. 6 ($T_g$) and 7 ($T_{max}$)

TABLE 2

| SAMPLE | $T_g$ (° C.) | $T_{5\%}$ (° C.) | $T_{max}$ (° C.) | char residue at 600° C. (wt %) |
|---|---|---|---|---|
| 1 | 120.0 | 369.0 | 436.3 | 12.3 |
| 2 | 117.3 | 362.1 | 430.7 | 9.7 |
| 3 | 118.7 | 358.7 | 433.5 | 9.4 |
| 4 | 116.7 | 356.2 | 434.2 | 10.3 |
| 5 | 113.9 | 353.4 | 429.3 | 10.6 |
| 6 | 113.5 | 360.5 | 436.3 | 8.9 |
| 7 | 112.3 | 353.5 | 435.0 | 10.3 |

As shown in TABLE 2, the glass transition temperature ($T_g$) of SAMPLES 1 to 7 are all higher than 110° C. The $T_g$ is in a negative solvent-dependent manner but only slightly decreased (about 7%) when the DIBK increases from 28 vol % to 40 vol %. The temperature at 5% weight loss ($T_{5\%}$) is all between 353° C. to 369° C. and the temperature at the maximum decomposition rate ($T_{max}$) is all higher then 429° C. The above data indicate that the membranes have excellent thermal stabilities.

Example 2

Figure 10:
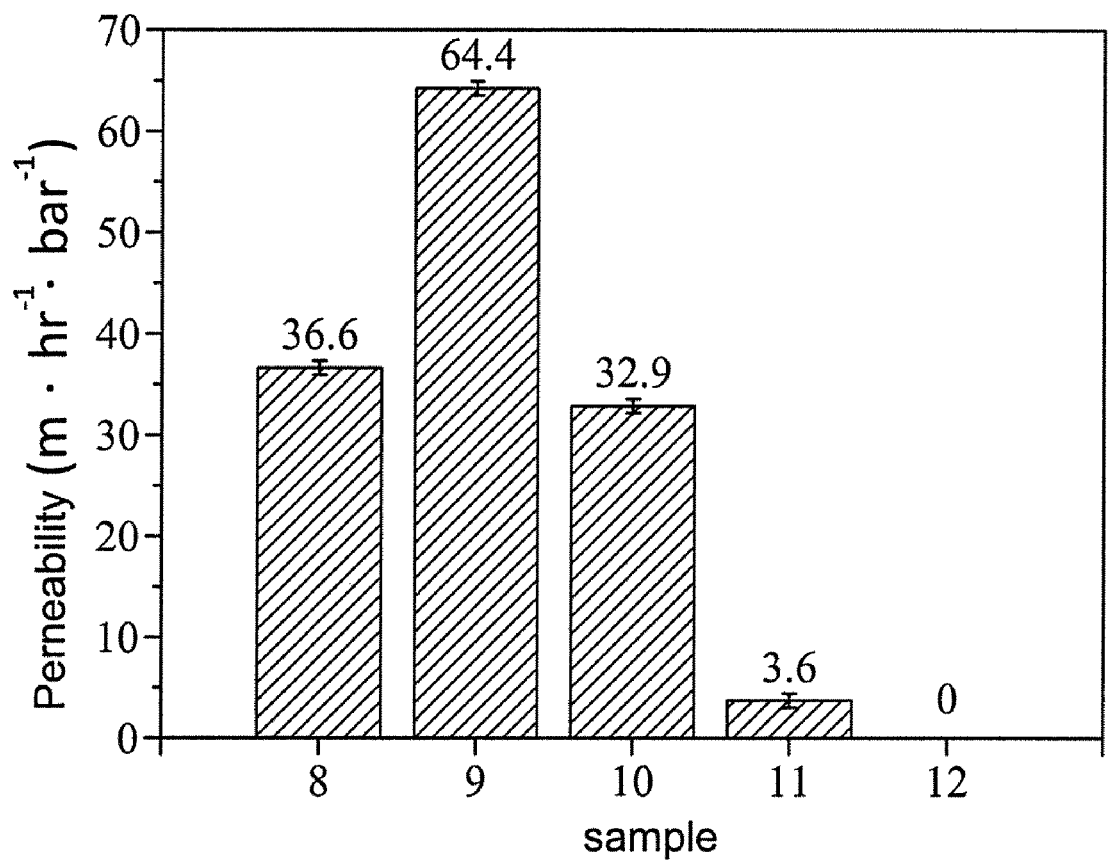
FIG. 10 shows the permeability of the membranes obtained in EXAMPLE 2.

Similar to EXAMPLE 1, D.E.R. 331 and DMP-30 were used. A primary amine diethylenetriamine (DETA) was further added to the reactant solution as a second curing agent. The weight ratio of the epoxy resin, the curing agents and the solvent was kept 58:8:34 while the ratio of the first curing agent (DMP-30) to the second curing agent (DETA) varied from 1:0 to 1:0.4. The SEM images of the membranes are shown in FIGS. 8A to 8E and 9A to 9E. The morphological and thermal properties of the membranes are shown in TABLES 3 and 4, respectively, and the permeability is plotted in FIG. 10.

TABLE 3

| SAMPLE | DMP-30: DETA (wt) | mean pore radius (µm) | pore density (N/µm²) | surface porosity | permeability (m · hr⁻¹ · bar⁻¹) | FIGS. |
|---|---|---|---|---|---|---|
| 8 | 1:0 | 0.11 | 4.68 | 0.19 | 36.6 | 8A 9A |
| 9 | 1:0.1 | 0.17 | 4.38 | 0.41 | 64.4 | 8B 9B |
| 10 | 1:0.2 | 0.14 | 3.0 | 0.18 | 32.9 | 8C 9C |
| 11 | 1:0.3 | 0.11 | 2.91 | 0.10 | 3.6 | 8D 9D |
| 12 | 1:0.4 | fine | fine | fine | 0 | 8E 9E |

It can be seen that an epoxy membrane with open pores can be formed in the presence of both a tertiary amine and a primary amine. The thermal stabilities of the membranes are acceptable. However, as the primary amine increases (e.g., SAMPLE 12), the membrane becomes impermeable.

The results also infer that the conventional curing agents, which are typically primary amines, are not suitable in preparing a porous epoxy membrane with open pores.

TABLE 4

| SAMPLE | DMP-30: DETA (wt) | $T_g$ (° C.) | $T_{5\%}$ (° C.) | $T_{max}$ (° C.) | char residue at 600° C. (wt %) |
|---|---|---|---|---|---|
| 8 | 1:0 | 353.1 | 430.7 | 115.5 | 11.4 |
| 9 | 1:0.1 | 345.7 | 436.1 | 104.2 | 12.3 |

TABLE 4-continued

| SAMPLE | DMP-30:DETA (wt) | $T_g$ (°C.) | $T_{5\%}$ (°C.) | $T_{max}$ (°C.) | char residue at 600° C. (wt %) |
|---|---|---|---|---|---|
| 10 | 1:0.2 | 345.8 | 435.6 | 98.8 | 9.9 |
| 11 | 1:0.3 | 342.9 | 433.2 | 99.7 | 11.7 |
| 12 | 1:0.4 | 341.5 | 434.6 | 105.7 | 11.0 |

What is claimed is:

1. A process for manufacturing a porous epoxy network with open pores comprising the steps of:
   providing a reactant solution comprising an epoxy resin, a solvent selected from n-hexane, cyclohexane, cyclohexanol, diisobutyl ketone, isopropanol, benzene, toluene, tetrahydrofuran, chloroform, methyl cyclohexane, dipropyl ether, methyl isobutanone, butyl butanoate, ethyl butanoate, and a combination thereof and a curing agent;
   performing a first curing process to transform the reactant solution to a gel; and
   performing a second curing process to essentially remove the remaining solvent and transform the gel to form a porous epoxy network with open pores;
   wherein the curing agent is a tertiary amine selected from the group consisting of 2,4,6-tris(dimethylamino methyl)phenol, 2-(diemthylamino methyl)phenol, α-methyl benzyl dimethyl amine, 2-dimethyl amino-2-hydroxy propane, triethanol amine, dialkyl amino ethanol, N,N'-dimethyl piperazine and a combination thereof.

2. The process of claim 1, wherein the epoxy resin is selected from the group consisting of diglycidyl ether of bisphenol A, diglycidyl ether of bisphenol F, polyglycidyl ether of phenol-formaldehyde novolac, polyglycidyl ether of o-cresol-formaldehyde novolac and a combination thereof.

3. The process of claim 1, wherein the solvent is diisobutyl ketone.

4. The process of claim 1, wherein the solvent is in an amount of 30 to 70 vol %.

5. The process of claim 1, wherein the tertiary amine is 2,4,6-tris(dimethylamino methyl)phenol.

6. The process of claim 1, wherein the curing agent is in an amount of 0.1 to 20 parts per 100 parts epoxy resin.

7. The process of claim 1, wherein the reactant solution further comprising a primary amine.

8. The process of claim 7, wherein the weight ratio of the primary amine to the tertiary amine is less than 1:1.

9. A process for manufacturing a porous epoxy membrane with open pores comprising the steps of:
   providing a reactant solution comprising an epoxy resin, a solvent selected from n-hexane, cyclohexane, cyclohexanol, diisobutyl ketone, isopropanol, benzene, toluene, tetrahydrofuran, chloroform, methyl cyclohexane, dipropyl ether, methyl isobutanone, butyl butanoate, ethyl butanoate, and a combination thereof and a curing agent;
   placing the solution on a carrier;
   performing a first curing process to transform the reactant solution to a gel; and
   performing a second curing process to essentially remove all the remaining solvent and transform the gel to a porous epoxy membrane with open pores;
   wherein the curing agent is a tertiary amine selected from the group consisting of 2,4,6-tris(dimethylamino methyl)phenol, 2-(diemthylamino methyl)phenol, α-methyl benzyl dimethyl amine, 2-dimethyl amino-2-hydroxy propane, triethanol amine, dialkyl amino ethanol, N,N'-dimethyl piperazine and a combination thereof.

10. The process of claim 9, wherein the epoxy resin is selected from the group consisting of diglycidyl ether of bisphenol A, diglycidyl ether of bisphenol F, polyglycidyl ether of phenol-formaldehyde novolac, polyglycidyl ether of o-cresol-formaldehyde novolac and a combination thereof.

11. The process of claim 9, wherein the solvent is diisobutyl ketone.

12. The process of claim 9, wherein the solvent is in an amount of 30 to 70 vol %.

13. The process of claim 9, wherein the tertiary amine is 2,4,6-tris(dimethylamino methyl)phenol.

14. The process of claim 9, wherein the curing agent is in an amount of 0.1 to 20 parts per 100 parts epoxy resin.

15. The process of claim 9, wherein the reactant solution further comprising a primary amine.

16. The process of claim 15, wherein the weight ratio of the primary amine to the tertiary amine is less than 1:1.

* * * * *